United States Patent [19]
Erickson

[11] 4,215,677
[45] Aug. 5, 1980

[54] SOLAR COLLECTOR PANEL ASSEMBLY

[75] Inventor: Donald P. Erickson, Denver, Colo.

[73] Assignee: Rocky Mountain Sheet Metal Company, Inc., Denver, Colo.

[21] Appl. No.: 828,433

[22] Filed: Aug. 29, 1977

[51] Int. Cl.² .................................................. F24J 3/02
[52] U.S. Cl. ................................... 126/450; 126/417
[58] Field of Search .............. 126/270, 271, 450, 446, 126/417; 237/1 A; 165/168, 172, 173, 175, 178, 485

[56] References Cited
U.S. PATENT DOCUMENTS

| | | | |
|---|---|---|---|
| 3,937,208 | 2/1976 | Katz et al. | 126/271 |
| 3,980,071 | 9/1976 | Barber, Jr. | 126/271 |
| 4,000,850 | 1/1977 | Diggs | 126/271 |
| 4,010,733 | 3/1977 | Moore | 126/450 |
| 4,015,586 | 4/1977 | Vroom et al. | 126/271 |
| 4,059,094 | 11/1977 | Barrio de Mendoza | 126/271 |
| 4,063,544 | 12/1977 | Bowen | 126/271 |
| 4,098,260 | 7/1978 | Goettl | 237/1 A |
| 4,112,922 | 9/1978 | Skinner et al. | 126/271 |
| 4,114,595 | 9/1978 | Barber | 126/270 |
| 4,120,288 | 10/1978 | Barrett | 237/1 A |
| 4,123,883 | 11/1978 | Barber, Jr. et al. | 126/270 |
| 4,136,669 | 1/1979 | Lane | 126/450 |

*Primary Examiner*—James C. Yeung
*Assistant Examiner*—Larry Jones
*Attorney, Agent, or Firm*—John E. Reilly

[57] ABSTRACT

Modular collector panels are adapted for flush or recessed mounting on a pitched roof, or may be installed on a flat roof by means of a mounting frame, the panel sections being interconnected in side-by-side relation to one another by a unique form of side and end wall connector assembly which serves to interconnect the panels in sealed relation to one another to the roof or other housing as well as to support and house the component parts of the panel section including the glazing, absorber plate and insulating layer in unitary relation to one another.

18 Claims, 9 Drawing Figures

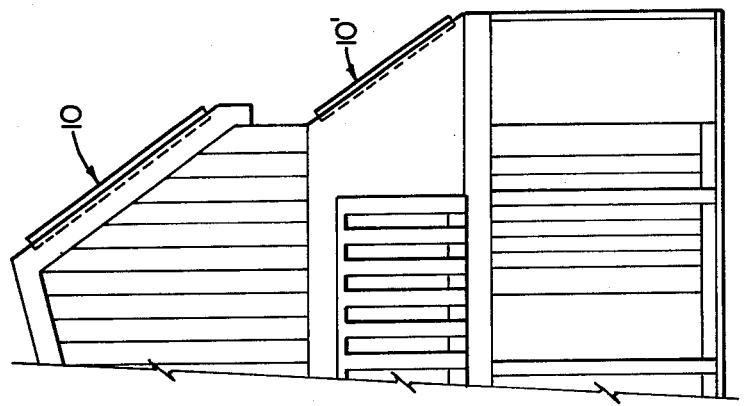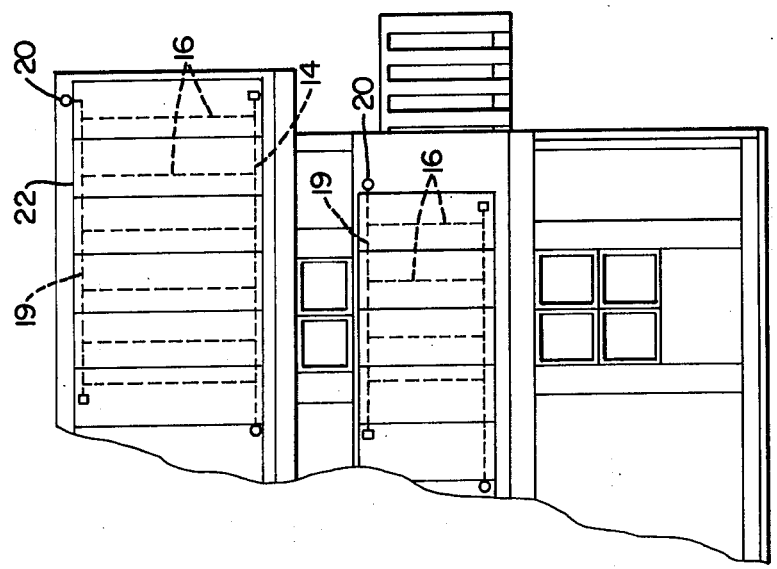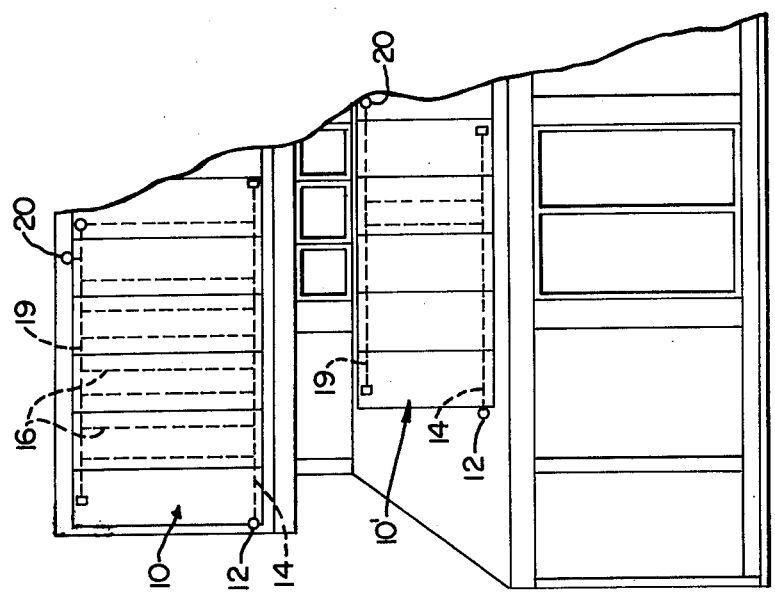

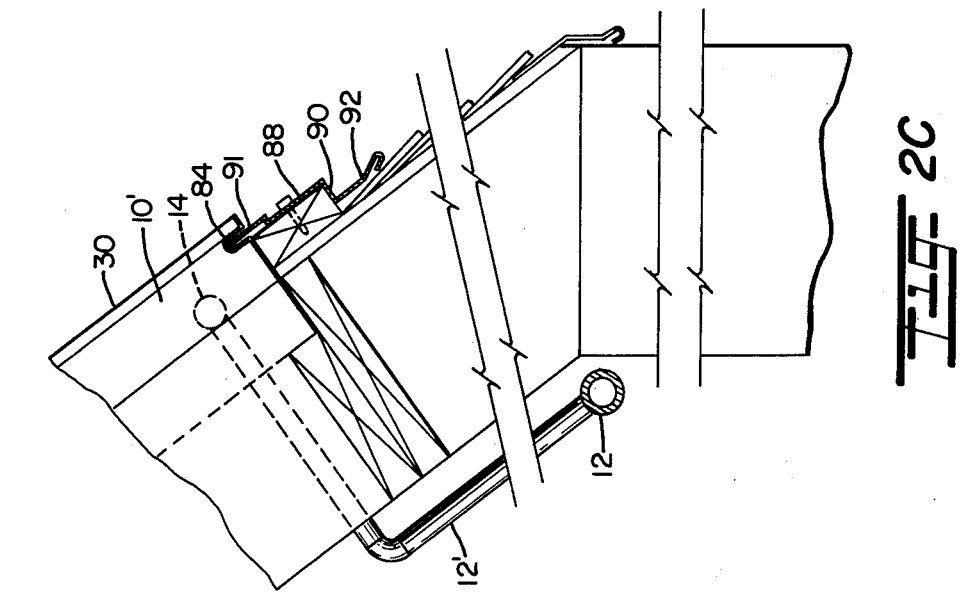
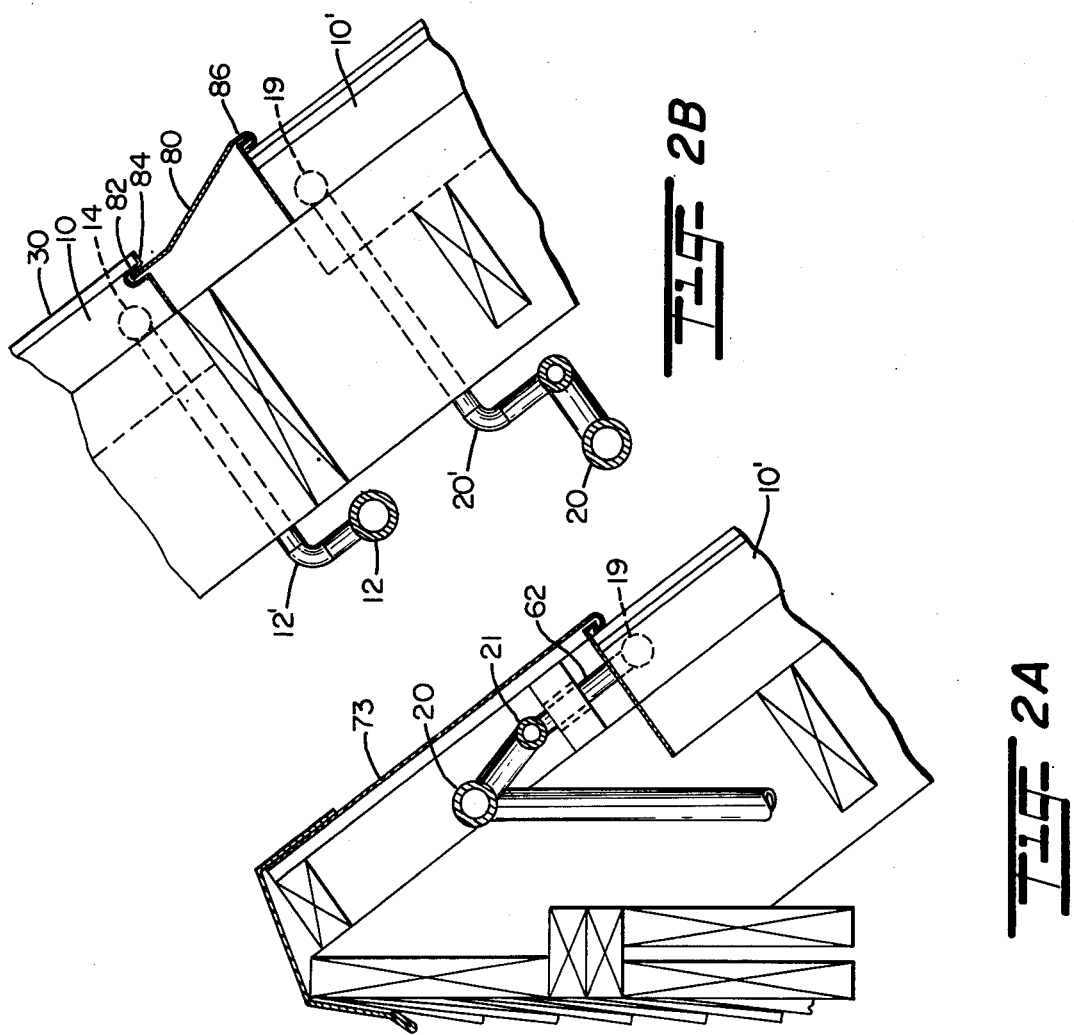

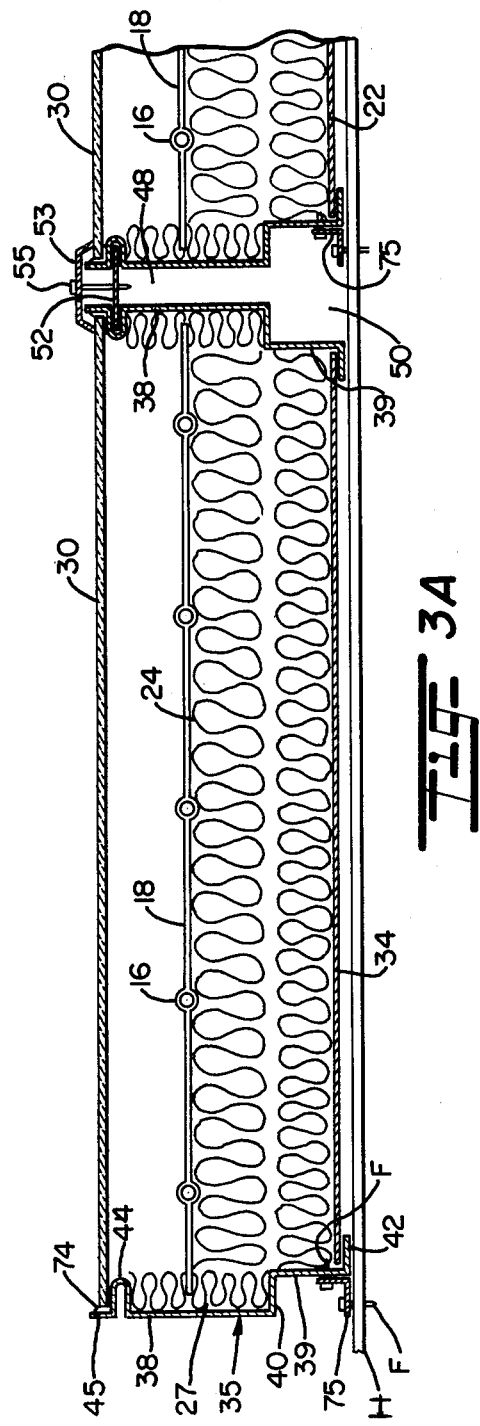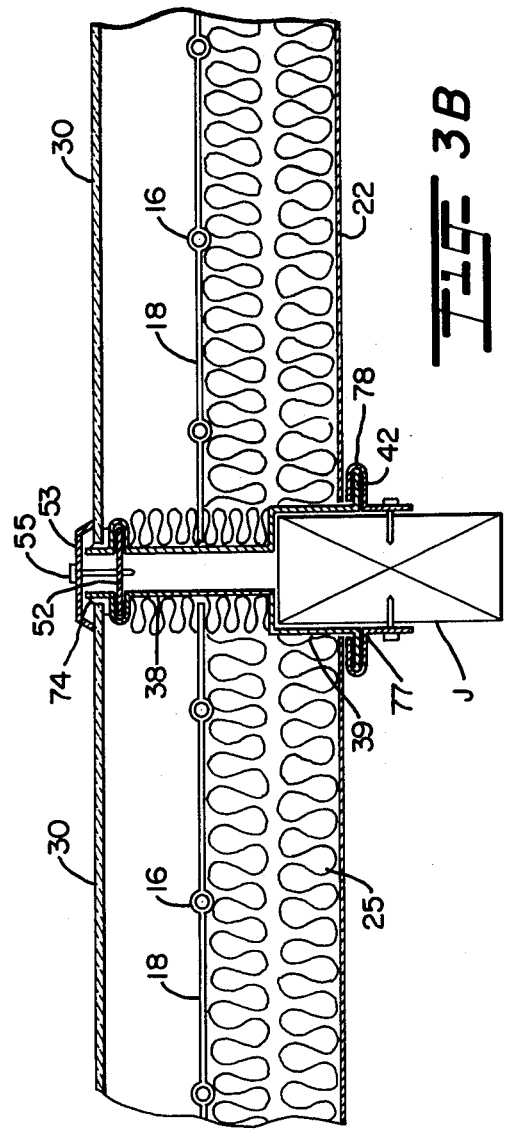

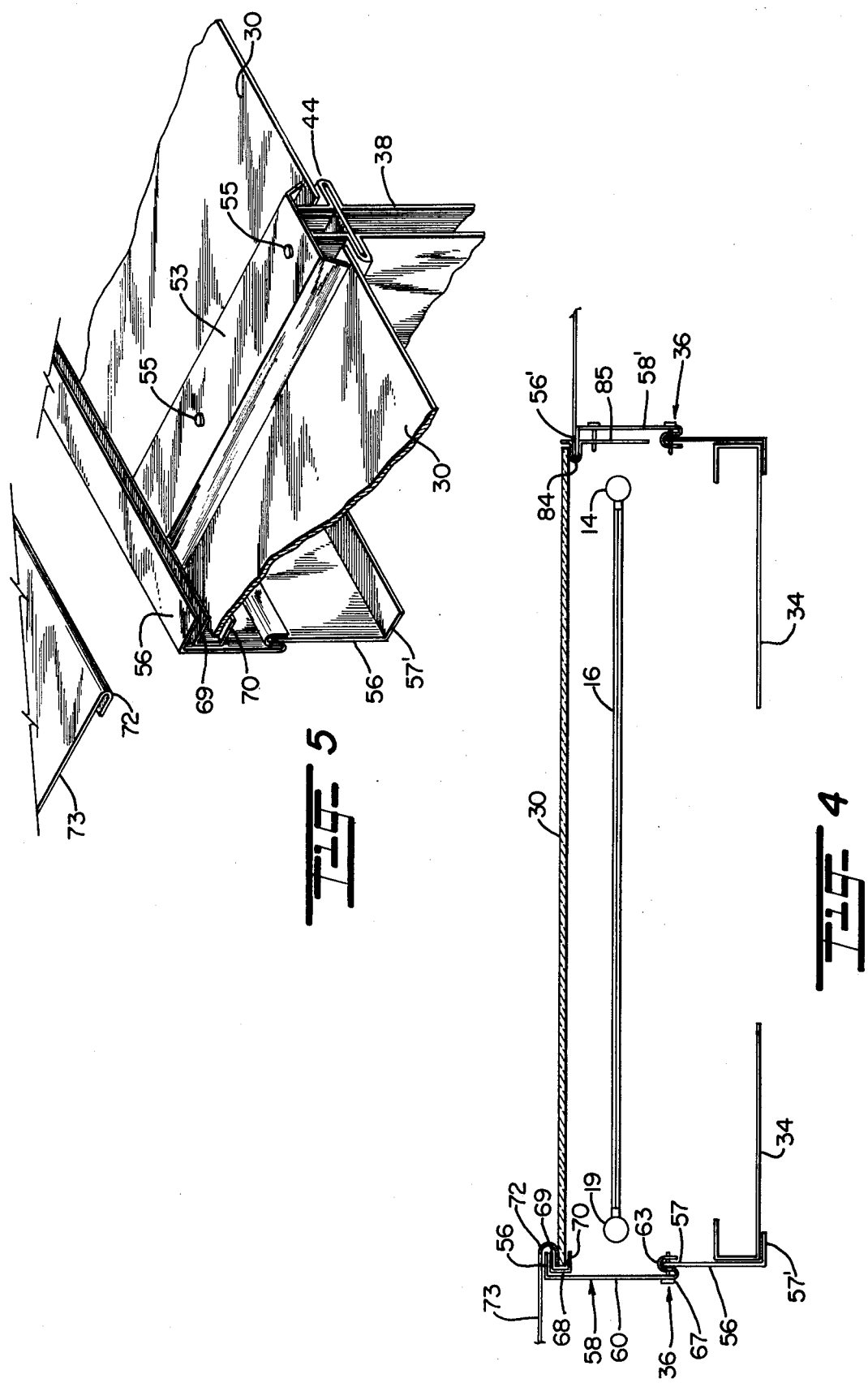

SOLAR COLLECTOR PANEL ASSEMBLY

This invention relates to novel and improved apparatus for installing modular solar collector panels, and more particularly relates to a method and means for joining flat solar collector panel sections together in sealed relation to one another while serving as a portion of the outer support or frame for the component parts of the panel sections.

BACKGROUND OF THE INVENTION

Numerous types of flat plate collector panel assemblies have been devised for solar installations and which can be constructed either as a part of a solar house or may comprise a part of a solar installation for an existing house. In the flat plate collectors, customarily an absorber plate is employed which is suitably comprised of steel, aluminum or copper plate coated with a matt black paint and characterized by its ability to absorb radiant energy and convert it to heat. The absorber plate is covered by glass in order to reduce the heat loss from the plate without a corresponding reduction in the heat input due to the selective transmittance of the sun's rays by the glass or glazing. Typically, either single or multiple layers of glass may be employed over the absorber plate. If thermal fluid, such as, air or water, is circulated as a conducting medium in thermal contact with the absorber plate, it will remove some of the heat absorbed by the plate and this is typically done through the utilization of spaced parallel tubes or pipes passing through undulations or grooves formed in the absorber plate. The fluid-circulating tubes are connected to a common supply header at one end of the plate and to a return header at the other end for transferring the thermal fluid from the tubing into a suitable heat storage area. An insulating layer is disposed beneath the absorber plate and additional insulating layers may be disposed in surrounding relation to the absorber plate as well as the glass covering and any intermediate air spaces between the glass and absorber plate. The entire collector described is assembled within a unitary frame or tray generally comprised of a flat bottom and outer side and end walls.

The foregoing is given more as a setting for the present invention in which it is proposed to provide for a novel and improved frame support consisting of a side and end wall connector assembly for each of a series of modular flat plate collector panels so as to facilitate interconnection of a series of panels in side-by-side unitary relation to one another. In this relation, modular collector panel assemblies have been proposed for use in the past. However, their use has required considerable amounts of on-site construction and assembly, have been limited in application and quite time-consuming to install.

It is therefore proposed to provide in a collector panel assembly for an improved frame which among other things serves as a means for supporting the various component parts of each panel section in place and facilitates interconnection between panel sections into a compact unitary structure in such a way as to minimize labor and time-consuming tasks at the installation site.

SUMMARY OF THE INVENTION

It is therefore an object of the present invention to provide for a novel and improved solar collector panel assembly of the modular type.

It is another object of the present invention to provide for flat plate collectors of the modular type having outer prefabricated frame supports for each panel section which are adaptable for interconnection in sealed relation to one another in a rapid and efficient manner.

It is a further object of the present invention to provide for a novel and improved frame support or tray for solar collector panel sections which is readily conformable for various different types of solar installations including flush or recessed mountings on pitched roofs as well as installation on a separate mounting frame for flat roofs and other surfaces.

It is an additional object of the present invention to provide for a prefabricated modular solar collector panel assembly characterized by having outer frames which serve the dual purpose of supporting the component parts of each panel section in desired relation to one another and to the main supply and return thermal fluid circulating lines while facilitating interconnection between adjacent sidewalls of each successive pair of modules in a novel and improved manner.

In accordance with the present invention, a preferred embodiment is directed to the outer frame or sidewall construction of a flat plate collector of the modular type wherein generally rectangular panels or modules are each made up of an absorber plate including thermal fluid conducting means extending therealong, an upper spaced glazing layer or plurality of layers together with an insulating layer beneath the absorber plate. The absorber plate, glazing and insulating layers are united into a single module by means of an outer frame provided with sidewalls each in the form of a unitary sidewall bracket traversing the length of each panel and having lateral projections at vertically spaced intervals to define the edge supports for the component parts of the panel. The lateral projections extend in opposite directions from the projection of the next adjacent sidewall in each successive panel, at least a pair of the oppositely directed projections forming a common support for a cap strip retainer plate adjacent to the upper edge of the panel sections. A cap strip retainer of inverted, generally U-shaped configuration covers the upper adjacent edges of the adjoining sidewalls of successive panels and fasteners extend downwardly through each cap strip retainer into the retainer plate. Each of the brackets is further so configured as to be offset adjacent to the lower end of each panel section to accommodate a rafter or joist either forming a part of the roof of a solar house or installed on the roof to serve as a base support for the panel assembly.

End wall brackets cooperate with the sidewall brackets in forming a unitary frame for each panel section, the end wall brackets comprised of upper and lower members, the upper members forming removable access panels or doors which facilitate proper positioning and interconnection of the panel section with respect to a roof, the removable access panels effecting connection of the supply and return line into the pipe in the absorber plate and uniting the flashing on the roof in overhanging, sealed relation to the cap strips along the upper and lower edges of each panel section. In the preferred form, each sidewall is made up of a single strip in which the lateral projections are formed out of the thickness of the material in order to define internally recessed ledges to support the glazing layers as well as to retain the cap strip retainer plates as described; and the end wall brackets have inwardly directed channels and ledges which cooperate with the ledges on the sidewall brackets to support the glazing layers in predetermined spaced relation above the absorber plate in each panel section.

The modular construction of the panel section permits disposition of the desired number in side-by-side relation to one another to occupy a predetermined area on the roof. By virtue of the offset portions which form a part of the sidewall brackets, the panel sections are adaptable either for recessed or flush roof mounting with a minimum number of steps required in the installation of the panel sections.

BRIEF DESCRIPTION OF THE DRAWINGS

Other objects, advantages and features of the present invention become more readily appreciated and understood from a consideration of the following detailed description of the preferred embodiment of the present invention when taken together with the accompanying drawings in which:

FIG. 1 is an elevational view of a solar house employing the modular flat plate collector assembly in accordance with the present invention.

FIG. 2 is an end view of the solar house shown in FIG. 1 and broadly illustrating the manner in which the flat plate collector panels are mounted on the roof of the house.

FIGS. 2A, 2B and 2C are fragmentary views illustrating in more detail the mounting of the collector panels on a roof.

FIGS. 3A and 3B are cross-sectional views illustrating a preferred form of surface mount and recessed mount, respectively, in accordance with the present invention.

FIG. 4 is a cross-sectional view taken at right angles to that illustrated in FIG. 3A; and FIG. 5 is a somewhat fragmentary, perspective view of the preferred form of panel assembly in accordance with the present invention.

DETAILED DESCRIPTION OF THE PREFERRED EMBODIMENT

The preferred form of the present invention will be described specifically with reference to a flat plate collector assembly employing water as the thermal fluid, although it is understood that air or other thermal fluid may be employed with a minimum of change in the system.

In FIGS. 1, 2, 2A, 2B and 2C there is shown by way of illustrative example a two-stage collector having upper and lower panel assemblies 10 and 10' in which water is pumped from a source of supply through field connections 12 leading to internal headers 14 at the lower end of each upper and lower assembly. Each header 14 communicates with a series of pipes 16 which are arranged in spaced parallel relation to one another and run lengthwise along a common absorber plate 18 shown in FIGS. 3 to 5 where heat is collected from the absorber plate then passes into internal header 19 communicating with a common return 20 which discharges into a storage area, not shown. Various conventional means of heat storage as well as means of circulation into a residence or other building can be utilized in a well-known manner and therefore will not be described in any further detail. However, a typical arrangement of supply and return connections are illustrated in FIGS. 2A, 2B and 2C. Briefly, as shown in FIG. 2C, a supply connector 12 leads through line 12' into the header 14 for lower panels 10'. In FIG. 2B a corresponding arrangement is shown for the lower end of the upper panels 10; also the field connection from internal header 19 through line 20' into the return 20. In FIG. 2C, the headers 19 are connected through an external header 21 to a collector return 20 at the upper end of the panels 10.

As illustrated in FIGS. 1 and 2, the panel assemblies 10 and 10' are mounted on upper and lower pitched roof sections of a house, and each panel assembly is correspondingly comprised of a plurality of generally rectangular, modular panel sections 22 which are disposed in side-by-side relation to one another so as to have their lengthwise dimensions extending in a vertical inclined direction and with the thermal fluid-conducting pipes 16 also extending lengthwise at closely spaced intervals through each modular panel and being connected into common, internal headers 14 and 19 at opposite ends of the panel assembly. Although as shown in FIG. 2, the panel assemblies are generally illustrated as being partially recessed into the roof line, the modular panels 22 are so constructed and arranged as to be conformable either for surface mounting or recessed mounting on a roof. This is best seen by reference to FIGS. 3A and 3B where panel sections 22 are illustrated in FIG. 3A as being mounted on the surface of the roof; whereas a pair of panel sections 22 are illustrated in FIG. 3B as being recess-mounted on a roof in a manner to be hereinafter described. It is emphasized that the different types of mounting as illustrated in FIG. 3 are provided only to highlight the versatility of the system although it will be evident that in actual practice either a surface or recessed mounting would be consistently followed throughout both for the upper and lower assemblies. Further, as shown in FIGS. 3–5, each modular panel section 22 is comprised of an absorber plate 18 having a series of pipes 16 as described extending lengthwise of each absorber plate and connected into the upper and lower internal headers. Conventionally, the absorber plate may suitably consist of a steel, copper or aluminum sheet having openings or grooves 23 to receive the pipe 16 and a sheet of aluminum foil 24 is disposed beneath the plate 18 and pipe 16. The absorber plate is supported upon insulating layers 25 and 26 as well as outer surrounding insulating layers 27 and all contained within a common enclosure 28. Further, an upper glass or glazing layer 30 is spaced above the absorber plate and it will be apparent that in accordance with conventional practice one or more glazing layers 30 may be employed.

An important feature of the present invention resides in the construction and arrangement of the outer enclosure or frame 28 as well as its method of installation. Each frame 28 for a panel section is in the general configuration of a tray having a bottom plate 34, opposite sidewalls 35 and opposite end walls 36. Each sidewall 35 comprises a unitary stamping or sheet having an intermediate, straight or vertical wall portion 38, a lower offset or recessed portion 39 interconnected to the portion 38 by a shoulder 40 and the lower offset portion terminating in a horizontal portion or foot 42. The upper end of the intermediate portion 38 is interrupted by a laterally projecting lip or ledge 44 in the form of a horizontally directed, generally U-shaped return which continues into an upper vertical straight portion 45 of limited length. As formed, each sidewall 35 is complementary to an adjacent sidewall 35 of the next successive panel section so that together the sidewall brackets define a relatively narrow space 48 between the portions 38, 45, and a wider space 50 between the lower offset portions 39. In order to join adjacent sidewalls 35 together, a common retainer plate 52 is inserted into and supported by the interior of the recessed, U-shaped returns of the aligned ledges 44. A cap strip 53 in the form of a relatively wide inverted U-shaped channel is placed over the upper edges 45 and is secured in place by screws 55 which extend through the cap strip at longitudinally spaced intervals and are anchored in bores formed in the retainer plate 52.

In turn, each end wall 36 of a panel section includes a lower straight vertical portion 56 having an upper edge 57 and a bottom angle or foot pad 57'. An upper removable door or access panel 58 has a straight wall portion 59 provided with an opening 60 for the projection of a duct 62 which interconnects the header 21 and return manifold 20 into the pipe 16 for each panel section. Each door 58 also has a bottom edge 63 in the form of a double return so as to provide a downwardly facing, U-shaped return for the insertion of the upper edge 57; and an upper lateral edge or angle 66 extends along the upper extremity of the straight portion 59. As illustrated, the upper door 58 may be secured to the lower straight portion 56 by screw fasteners 67 extending through the lower return portion 64 at horizontally spaced intervals. In one of the end walls which serves as the upper end wall, the angle 66 at the upper extremity of straight portion 59 is spaced above a channel member 68 which is turned on its side so as to have upper and lower free ends 69 and 70 facing inwardly toward the opposite end wall of each panel section. The channel 68 receives and supports the glass layer 30 in cooperation with the sidewall ledges 44 in spaced relation above the absorber plate; also, the door 58 in the lower end wall has an upwardly directed ledge 44' in place of the channel 68, the ledge 44' also supporting one end of the glazing layer 30. The end channel 68 is also adapted to receive the lower free, reverse curved edge 72 of an upper cap flashing strip 73, the edge 72 being interposed between the upper surfaces of the cap strips 53 joining the panel sections 22 and the upper extremity 66 of the straight portions 59 of the end walls. In this manner, the flashing serves to seal the upper and lower ends of the cap strips 53 against the entry of moisture or foreign matter. Additionally, the intervening spaces between the cap strips and the edges 72 may be filled with a suitable caulking or sealant 74 upon assembly and installation so as to prevent entry of water between the cap strip and glass layers.

In the surface mounting as shown in FIG. 3A, the lower offset portions of the sidewall brackets are affixed directly to the studding represented at H by fasteners F extending through an angle clip 75. However, in the recessed mounting of FIG. 3B, the offset portions 39 are adapted to fit over rafters or joists represented at J in a roof and be affixed thereto by angle clips 77 having upper returns 78 to receive the feet 42, the lower ends of the angles 77 being attached to opposite sides of the joist by fasteners F. In either type of installation, the modular panels are successively assembled and installed first by joining the outermost sidewall at one end of the assembly to the studding or joists, followed by insertion of a retainer 52 in the opposite sidewall. The next panel section is then assembled in the same manner starting with a first sidewall in adjacent but spaced relation to the last sidewall assembled of the first panel section and aligning the slotted side of the ledge 44 with the retainer 52. The adjacent sidewalls are then joined together by a cap strip 53 as described. As the panel section is assembled it is important that the upper removable door portions 58 of the end walls 36 be the last portion to be assembled so as to permit connection of the piping 16 into the supply and return lines by means of the ducts 62.

Referring once again to FIGS. 2A, B and C, the installation is completed by fastening the various flashing strips in place. As shown in FIG. 2A, the flashing strip 73 is extended along the entire width of the panel assembly so as to seal the upper ends of the panel sections as previously described. Similarly, as shown in FIG. 2B, a flashing strip 80 may be employed to interconnect the upper and lower assemblies 10 and 10', respectively, the upper edge 82 of the flashing being inserted into a slotted portion of the ledge 44' being formed in an inwardly spaced vertical portion 85 from the removable door portion 58' in the lower end wall 36 of the panel assembly, the upper edge being wedged in place by upper angular portion 56' of door strip 58' and the glazing layer 30 having its lower edge resting upon the ledge 44'. The lower edge 86 of the flashing 80 is bowed outwardly somewhat and of the same configuration as the return portion 72 of the upper flashing 73 so as to be inserted into position along the upper end wall portion of the lower assembly 10'. As shown in FIG. 2C, a flashing 88 is fastened to a stud 90 and has an upwardly projecting edge 91 inserted into the slotted portion of the ledge 44' in the manner described with reference to FIG. 2B. The lower edge 92 of the flashing 88 may assume any desired configuration and as shown is bent over the stud 90 and extended downwardly to overlap the upper surface of the roof.

It will be appreciated from the foregoing that any number of panel sections may be interconnected in side-by-side relation to one another either for surface or recessed mounting on a pitched roof. Of course, the entire collector assembly is readily conformable for mounting on flat roofs simply by the use of a pitched mounting frame. The side and end wall construction of the lower enclosure for the modular panel sections permits prefabrication of these sections with a minimum of on-the-job fitting and labor required. The panel sections may be of virtually any desired dimension but optimally will extend anywhere from four feet to twenty-four feet in length and on the order of two feet in width in order to provide the necessary rigidity and strength for utmost ease in handling and positioning in place.

Although the present invention has been described with particularity relative to the foregoing description of an exemplary preferred embodiment, various other modifications, additions, and changes may be made which will be readily apparent to those skilled in the art without departing from the spirit of this invention.

I claim:

1. In a solar collector panel assembly, a prefabricated modular panel section adapted for interchangeable mounting on the flat external surface of a roof or between spaced adjacent joists on a roof comprising in combination:

an absorber plate having opposite sides and ends, an insulating layer beneath and in surrounding relation to said absorber plate, and an upper glazing layer spaced above said absorber plate, and an outer enclosure having a bottom panel beneath said insulating layer, end wall panels along opposite ends of said panel section with the lower edges of said end wall panels adjoining opposite ends of said bottom panel, and vertical sidewall panel members along opposite sides of said panel section extending the length thereof, each sidewall panel member having a glazing layer-supporting ledge directed inwardly from said sidewall panel member adjacent to its upper end, an outwardly directed channel, and a lower inwardly offset portion disposed beneath one of said opposite sides of said absorber plate and terminating in a lower edge adjoining a side edge of said bottom panel, each sidewall panel member including means for interchangeable mounting on the external flat surface of a roof or in a recessed roof mounting in which the spacing between said lower inwardly offset portions of each panel section is such as to permit said lower inwardly offset portions to be inserted between spaced adjacent joists along the roof.

2. In a solar collector assembly according to claim 1, at least one end wall panel including a bracket joined to the end of said bottom panel and extending vertically therefrom, and an upper bracket including a straight vertical portion having a lower downwardly facing return portion at its lower edge, releasable connecting means for releasably connecting said upper bracket to the upper edge of said lower bracket, said straight vertical portion of said upper bracket having a duct opening extending therethrough, an upper inwardly directed ledge at the upper extremity of said access bracket, and a removable glazing support bracket associated with said upper bracket defining a glazing layer supporting ledge in spaced adjacent relationship beneath said uppermost inwardly directed ledge.

3. In a solar collector panel assembly according to claim 1, each said sidewall panel being in the form of a unitary bracket in which said glazing layer supporting ledge is slotted.

4. In a solar collector panel assembly according to claim 1, wherein said lower inwardly directed offset portion is defined by an inwardly stepped shoulder portion.

5. In a solar collector panel assembly according to claim 1 wherein said outwardly directed channel is formed internally in said ledge.

6. In a solar collector panel assembly according to claim 1 wherein one of said end wall panels includes a bracket joined to the end of said bottom panel and extending vertically upwardly therefrom, an upper bracket including a straight vertical portion terminating in a downwardly directed channel means to receive the upper edge of said lower bracket, and releasable connecting means associated with said channel for connecting said upper bracket to said lower bracket.

7. In a solar collector panel assembly having at least one generally rectangular modular panel section, each section including an absorber plate, thermal fluid conducting means associated with said absorber plate and communicating with supply and return lines at opposite ends of each said panel section, an insulating layer beneath said absorber plate and an upper glazing layer disposed above said plate, the improvement comprising:
an outer enclosure for each panel section including a bottom panel, opposite sidewall panels and opposite end wall panels, each sidewall panel defined by an elongated bracket extending the length of said panel section including a lower inwardly offset portion including means for connection to the roof surface and terminating in a lower edge adjoining a lateral edge of said bottom panel and an upper lateral projection forming a continuous ledge projecting inwardly toward the opposite sidewall panel, each end wall panel extending along an opposite end of each panel section having a lower edge adjoining an edge of said bottom panel and an upper removable access strip extending continuously along at least one end wall panel including an upper ledge aligned with said ledges on said sidewall panels to cooperate therewith in supporting said glazing layer in spaced relation above said absorber plate; and
interconnecting means for interconnecting adjoining sidewalls of adjacent panel sections together including a retainer plate, a cap strip overlapping upper edges of said adjoining sidewalls and fastener means extending through said cap strip to anchor said cap strip to said retainer plate.

8. In a solar collector panel assembly according to claim 7, including a first cap flashing member extending from the roof at one end of each panel section having a return portion interposed between said cap strip and the upper edge of said end wall bracket for each panel section along one end wall thereof.

9. In a solar collector panel assembly according to claim 8, including a second cap flashing member extending from the opposite end wall for attachment to the roof.

10. In a solar collector panel assembly according to claim 7, each end wall panel including a lower bracket joined to the end of said bottom panel and extending vertically upwardly therefrom, and said upper removable access strip including a straight vertical portion having a lower downwardly facing return portion at its lower edge adapted to be releasably connected to the upper edge of said lower bracket, a duct opening extending therethrough, and an upper inwardly directed edge at the upper extremity of said access strip.

11. In a solar collector panel assembly according to claim 7, each said sidewall panel being in the form of a unitary bracket in which said glazing layer supporting ledge is slotted to receive said retainer plate.

12. In a solar collector panel assembly according to claim 7, wherein said lower offset portion is defined by an inwardly stepped shoulder portion.

13. In a solar collector panel assembly adapted for mounting on a pitched roof, said assembly having a plurality of generally rectangular, modular panel sections, each section including an absorber plate, thermal fluid conducting means associated with said absorber plate and communicating with supply and return lines at opposite ends of each said panel section, an insulating layer beneath said absorber plate and an upper glazing layer disposed above said plate, the improvement comprising:
an outer enclosure for each panel section including a bottom panel, opposite sidewall panels and opposite end wall panels, each sidewall panel defined by an elongated bracket extending the length of said panel section including a lower panel portion including means for connection to the roof surface and terminating in a lower edge adjoining a lateral edge of said bottom panel and an upper laterally projecting return forming a continuous ledge projecting inwardly toward the opposite sidewall panel, each end wall panel extending along an opposite end of each panel section having a lower bracket adjoining an edge of said bottom panel, and an upper removable access strip extending continuously along each end wall panel including an upper ledge aligned with said ledges on said sidewall panels to cooperate therewith in supporting said glazing layer in spaced relation above said absorber plate; and interconnecting means for interconnecting adjoining sidewalls of adjacent panel sections including a retainer plate inserted within inner recessed portions of aligned ledges in said sidewall panels, a cap strip overlapping upper edges of said adjoining sidewalls, and fastener means extending through said cap strip to anchor said cap strip to said retainer plate.

14. In a solar collector panel assembly according to claim 13, a cap flashing at the end of each panel extending from the roof above the upper section having a return portion interposed between said cap strip and the upper edge of said end wall bracket for each panel section along the said upper end wall.

15. In a solar collector panel assembly according to claim 13, said lower panel portions of adjoining sidewalls of adjacent panel sections defining a common space therebetween adapted to receive a joist in the roof for recessed mounting of said panel assembly with respect to a pitched roof.

16. In a solar collector panel assembly, a prefabricated modular panel section adapted for interchangeable mounting on the flat external surface of a roof or between spaced adjacent joists on a roof comprising in combination:

an absorber plate, an insulating layer beneath and in surrounding relation to said absorber plate, and an upper glazing layer spaced above said absorber plate;

an outer support frame having a bottom panel beneath said insulating layer, end wall panels along opposite ends of said panel section with the lower edges of said end wall panels adjoining opposite ends of said bottom panel, one of said end wall panels including an upper removable access panel having an inwardly directed glazing layer support ledge, and sidewall panels along opposite sides of said panel section extending the length thereof, each sidewall panel having an inwardly directed glazing layer support ledge adjacent to its upper end and a lower inwardly offset portion disposed beneath said absorber plate and terminating in a lower edge adjoining opposite side edges of said bottom panel, said panel section including means for interchangeable mounting on the external flat surface of a roof or in a recessed roof mounting in which the spacing between said lower inwardly offset portions of each panel section is such as to permit said lower inwardly offset portions to be inserted between adjacent joists along the roof; and interconnecting means for interconnecting adjoining sidewalls of adjacent panel sections together including a retainer plate, a cap strip overlapping upper edges of said adjoining sidewalls and fastener means extending through said cap strip to anchor said cap strip to said retainer plate.

17. In a solar collector panel assembly according to claim 16 in which said support ledge on the access panel for one of said end walls is defined by an inwardly directed channel.

18. A solar collector panel assembly adapted for interchangeable mounting on the flat external surface of a roof or between spaced adjacent joists on a roof comprising:

an absorber plate having opposite sides and ends, an insulating layer beneath and in surrounding relation to said absorber plate, and an upper glazing layer spaced above said absorber plate;

an outer enclosure having a bottom panel beneath said insulating layer, end wall panels along opposite ends of said panel assembly with the lower edges of said end wall panels adjoining opposite ends of said bottom panel, and sidewall panel members along opposite sides of said panel assembly extending the length thereof, each sidewall panel member having a glazing layer-supporting ledge directed inwardly from said sidewall panel member adjacent to its upper end and a lower inwardly offset portion disposed beneath one of said opposite sides of said absorber plate and terminating in a lower edge adjoining a side edge of said bottom panel, each sidewall panel member including means for interchangeable mounting on the external flat surface of a roof or in a recessed roof mounting in which the spacing between said lower inwardly offset portions of each panel section is such as to permit said lower inwardly offset portions to be inserted between spaced adjacent joists along the roof, one of said end wall panels including a bracket joined to the end of said bottom panel and extending vertically therefrom, and an upper bracket including a straight vertical portion having a lower downwardly facing return portion at its lower edge, said straight vertical portion of said bracket having a duct opening extending therethrough, and an upper inwardly directed ledge at the upper extremity of said access bracket;

releasable connecting means for releasably connecting said upper bracket to the upper edge of said lower bracket; and a removable glazing support bracket associated with said upper bracket defining a glazing layer-supporting ledge in spaced adjacent relationship beneath said uppermost inwardly directed ledge.

* * * * *